United States Patent [19]

Bull et al.

[11] Patent Number: 4,716,774

[45] Date of Patent: Jan. 5, 1988

[54] FORCE MEASURING CELL WITH A FORCE SENSOR IN THE FORM OF A BENDABLE SUPPORT

[75] Inventors: David C. Bull, Hinwil; Juerg Hasler, Winterthur, both of Switzerland

[73] Assignee: Mettler Instrumente AG, Greifensee, Switzerland

[21] Appl. No.: 868,597

[22] Filed: May 30, 1986

[30] Foreign Application Priority Data

Jul. 5, 1985 [CH] Switzerland .......................... 2902/85

[51] Int. Cl.⁴ .............................................. G01L 1/22
[52] U.S. Cl. ...................................... 73/862.65; 338/5
[58] Field of Search ...................... 73/862.65; 177/211, 177/229; 338/5

[56] References Cited

U.S. PATENT DOCUMENTS

| | | |
|---|---|---|
| 3,180,139 | 4/1965 | Soderholm . |
| 3,927,560 | 12/1975 | Farr . |
| 4,089,217 | 5/1978 | Rahav et al. ............... 73/862.65 |
| 4,107,985 | 8/1978 | Sommer . |
| 4,128,001 | 12/1978 | Marks . |
| 4,143,727 | 3/1979 | Jacobson . |
| 4,419,902 | 12/1983 | Somal .................... 73/862.65 |

FOREIGN PATENT DOCUMENTS

| | | |
|---|---|---|
| 1538990 | 9/1968 | France . |
| 0162023 | 12/1981 | Japan ................ 73/862.65 |
| 0067424 | 4/1984 | Japan ................ 177/211 |
| 2107072 | 4/1983 | United Kingdom . |

OTHER PUBLICATIONS

"Thin-Film Strain-Gauge Transducers", Philips Tec. Rev., 39:94-101, No. ¼, 1980, Eindhoven, Netherland.
V. H. A. Schmidt, "Kupferdraht-ein neues Werkzeug fur die Feinwerktechnik", Feinwerk Technik, 74:321-324, No. 8, Aug. 1970.

*Primary Examiner*—Charles A. Ruehl
*Attorney, Agent, or Firm*—Holman & Stern

[57] ABSTRACT

A force measuring cell has a force sensor in the form of a bendable support. The base part and the load-receiving element of the force sensor are connected by two elastically bendable link members with pronounced bendable segments. Strain gauge elements in the form of strips are disposed on the bendable segments of one of the link members, to produce an electrical signal corresponding to the force (F) being measured. In order to achieve uniformity of the magnitudes of the stresses on all the bendable segments when under load, the mean material thickness of the bendable segments of the link member, which bendable segments are disposed closest to the base part, is thicker than the mean material thickness of the other bendable segments, corresponding to the larger bending moments which occur at the first-mentioned bendable segments. Thus the same degree of expansion or compression occurs in all the bendable segments and in the strain gauge elements associated with said bendable segments. This facilitates maintaining a Hooke's law relationship, thus improving linearity, and further, providing improved overload protection.

6 Claims, 2 Drawing Figures

FORCE MEASURING CELL WITH A FORCE SENSOR IN THE FORM OF A BENDABLE SUPPORT

BACKGROUND OF THE INVENTION

The invention relates to a force measuring cell with a force sensor in the form of a bendable support, wherein one end of the support is in the form of a base piece which is rigid with respect to bending, and the other end of the support is in the form of a load-receiving element, also rigid with respect to bending, wherewith the load-receiving element is connected to the base piece by means of two elastically bendable link members with bendable segments, which segments are characterized by a weakening of the material, and the force measuring cell is provided with expansion-measuring strips, e.g. strain gauges, disposed on the bendable segments on at least one of the link members, for generating an electric signal in accordance with the force being measured.

Force measuring cells with force sensors of the bendable support type are known, for example in U.S. Pat. Nos. 4,107,985 and 4,143,727. In addition, force measuring cells are commercially available in which the strain gauge elements are disposed on the bendable segments of the elastically bendable link members.

In the known force sensors of this type, the mean material thickness of the two bendable segments of an elastically bendable link member is the same. The result of this is that when the force sensor is stressed, the stresses on the two bendable segments of a link member are unequal in magnitude. In the event of ideal parallel guiding of the load-receiving elelments with respect to the base part, it would be possible to achieve a condition in which equal bending moments would be developed on both bendable segments of each link member. However, in a practical embodiment of the bendable support, wherein the link members have a certain degree of stiffness, the bending moment of the entire bendable support is superimposed over these individual bending moments. The result is a higher bending moment on the bendable segments of the link member, which bendable segments are disposed near the base part—higher than on the bendable segments disposed near the load-receiving elements, and the influence of the superimposed bending moment increases as the stiffness of the link members increases.

The non-uniform loading of the bendable segments has the consequence that theload-bearing capability of the force sensor is limited by the tolerable stress on the more heavily loaded bendable segments, while the load range of the less heavily loaded bendable segments is not completely utilized. In addition, there is a hazard that the stress on the more heavily loaded bendable segments will exceed the tolerable level. There is no assurance that the desired proportionality between the force being measured and the electrical signal corresponding to said force will be maintained, or that the required protection against overloading will be provided, under these conditions.

SUMMARY OF THE INVENTION

An object of the present invention is to devise a force measuring cell which affords improved linearity of the force vs. signal characteristic and improved protection against overload.

This object is achieved in the force measuring cell according to the present invention in that the mean material thickness of the bendable segments of the link members, which bendable segments are disposed closer to the base part, is greater than in the other bendable segments, such that stresses of equal magnitude are applied to all bendable segments when under load.

An advantage resulting from the present invention is that the same level of compressive or expansive strain is applied to all the bendable segments and to the strain gauge elements associated with said segments. This facilitates preservation of the Hooke's law relationship, and increases protection against overload.

Another drawback of known force sensors of the type of prior art force sensor described herein above, which drawback detracts from linearity between the force and the signal, is that the stress along the length of a bendable segment varies under load, due to the fact that the bendable segments are bounded in customary fashion on the mutually facing sides of the link members by means of skin surfaces e.g. of circular material recesses. Accordingly, the strain gauge elements disposed on the bendable segments are non-uniformly stressed over their lengths.

This disadvantage can be avoided if the bendable segments are given a wedge-like shape, wherewith in each case the thicker end of a bendable segment faces the end of the support, which end is closest to said bendable segment. With this measure, uniform tensile or compressive straining of the material may be attained over the entire length of the bendable segment, with accompanying improvement of the linearity in the force vs. signal characteristic.

The invention also relates to a method of manufacturing the inventive force measuring cells, comprising producing the longitudinal profile of the force measuring cell by means of spark erosion.

This method has proven to be particularly suited for simultaneous manufacture of a plurality of force measuring cells. Advantageously, in such a manufacture, the longitudinal profile of the force sensors is produced with wire electrodes on the transverse profile of an elongated plate, using a spark erosion technique through the entire length of the plate; since the wire putting position is computer controlled there is no problem in realizing the wedge-like structures which tend to defy conventional mechanical machining. and on at least one surface of the plate, a plurality of identical masks for stagewise application of thin-layer sensors is produced by means of a multicopy technique; and further, after the application of the thin-layer sensors and the production of the longitudinal profile, the plate is divided into the individual force measuring cells by means of separating cuts which are made transversely to the longitudinal direction of the plates.

BRIEF DESCRIPTION OF THE DRAWINGS

Examplary embodiments of the invention are illustrated in the drawings.

DETAILED DESCRIPTION OF THE INVENTION

Figure 1:
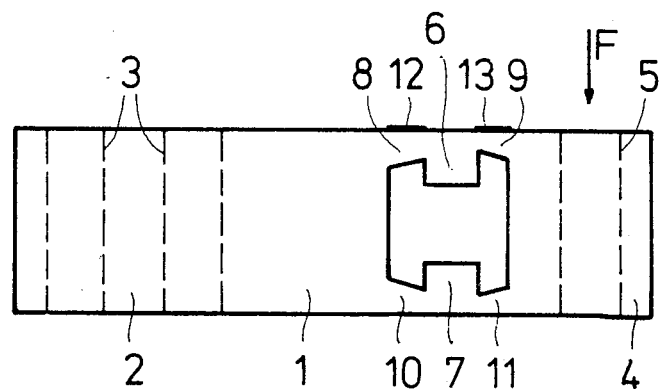
FIG. 1 is a longitudinal profile view of the inventive force measuring cell.

The force measuring cell illustrated in FIG. 1 comprises a force sensor in the form of a bendable support. The end of the support is in a form of a base part 2 which is stiff with respect to bending and with is intended to be disposed in a fixed position. Two bore holes 3 are provided for attaching the base part 2 to an underlying support structure. The other support end is in the form of a load-receiving element 4 which is stiff with respect to bending and is provided with a bore hole 5 for attaching the force sensor or for holding a transmitting member for applying the force F which is to be measured. The load-receiving element 4 and base part 2 are joined together by two elastically bendable link members which form a parallel guide means for the load-receiving element 4. The link members have pronounced bendable segments (8, 9, 10, 11) which are defined be weakening of the material. The link members (6 and 7) are stiff between these bendable segments. Strain gauge elements (12 and 13) are disposed on bendable segments (8 and 9) of link member 6. These strain gauge elements are preferably in the form of thin-layer sensors. In a variant embodiment, strain gauge elements are also provided on the bendable segments (10 and 11) of the other link member 7.

The bendable segments (8, 9, 10, 11) have wedge-like shapes, with the thicker end of bendable segments 8 and 10 facing th base part 2 and the thicker end of bendable segments 9 and 11 facing the load-receiving element 4. The wedge-like shape is formed by a segment of a parabola; in small force measuring cells this is very nearly a straight line. By appropriate choice of the angle of the wedge (or choice of the parameters of the parabola segment) a situation is obtained wherein, under load, each bendable segment experiences a uniform tension or compression stress of its material over its entire length, and correspondingly the associated strain gauge element if also stressed uniformly over its entire length.

Further, the mean material thickness on the bendable segments 8 and 10 which are located closer to the base part 2 is greater than that on the other bendable segments 9 and 11; the ratio of thicknesses is chosen such that, under load, stresses of the same magnitude are applied to bendable segments 8 and 10 as are applied to bendable segments 9 and 11.

Figure 2:
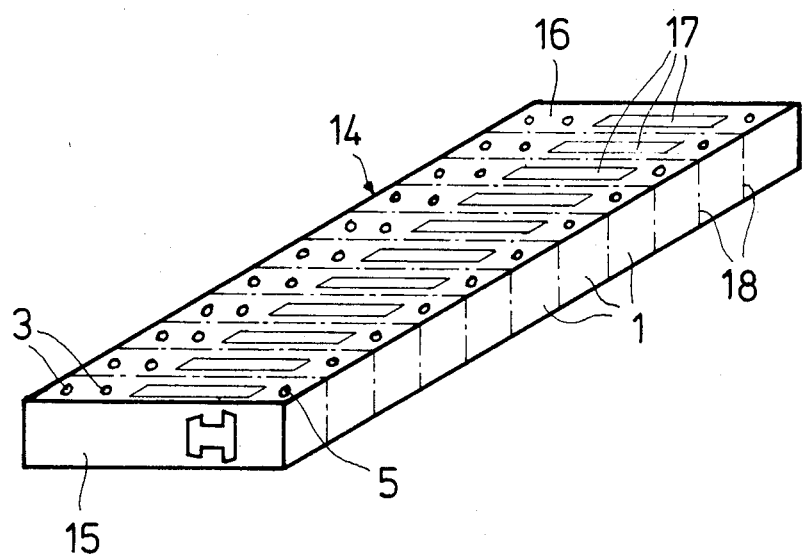
FIG. 2 is a perspective view of a plate ready for simultaneous manufacturing of a number of force measuring cells according to FIG. 1.

The longitudinal profile of the force sensor 1, i.e., the hollow (in the sense of being perforated) profile defining the bendable segments, is produced in a spark erosion process. Preferably, a number of force measuring cells are manufactured simultaneously from a single piece of material, and are then separated. A suitable method for this will be explained with refernce to FIG. 2.

A row of force measuring cells is fabricated from an elongated plate 14, wherewith the bore holes 3 and 5 are formed first, and then the longitudinal profile of the force sensor 1 is produced over the entire length of the plates, by means of a spark erosion process with wire electrodes, carried out on the transverse profile 15 of the plate 14. In a subsequent process step, a plurality of identical masks for the stagewise application of thin-layer sensors 17 is produced on the surface 16 of the plate 14, using a multicopy technique. After the thin-layer sensors 17 are applied, the plate 14 can be divided to yield the individual force measuring cells, via separating cuts 18 transverse to the longitudinal direction of the plate. The sequence of process steps mentioned is not mandatory. Thus, e.g. the spark erosion may alternatively be carried out after the application of the thin-layer sensors. Obviously, the same technique may be used to manufacture a plurality of rows of force-measuring cells simutaneously, from a correspondingly wider plate. The inventive configuration of the force measuring cells is particularly advantageous for small cells with high maximum load.

While a preferred embodiment has been shown and described, it will be understood that the present invention is not limited thereto, but may be otherwise embodied within the scope of the following claims.

What is claimed is:

1. A force measuring cell for measuring a force due to a load, comprising a force sensor in the form of a bendable support, wherein one end of the support is in the form of a base part which is rigid with respect to bending, and the outer end of the support is in the form of a load-receiving element adapted to receive a load; said other end of said support being rigid with respect to bending, the load-receiving element being connected to the base part by a plurality of elastically bendable link members, each link member having two bendable segments, one of said bendable segments being disposed closer to the base part than the other bendable segment, said bendable segments having relatively smaller cross sections than other parts of the elastically bendable link member; expansion-measuring strips disposed on the bendable segments on at least one of the link members, for generating an electric signal in accordance with the force being measured; the mean material thickness of said one bendable segment of each link member being greater than that of the other bendable segment thereof, and the ratio of said thicknesses being such that stresses of equal magnitude are applied to all the bendable segments when under the load.

2. A force measuring cell according to claim 1, wherein the bendable segments have a wedge-like shape, wherewith the thicker end of each bendable segment faces the respective end region of the support.

3. A force measuring cell according to claim 1, wherein said expansion measuring strips are in the form of thin-layer strip sensors.

4. A method of manufacturing the force measuring cell of claim 1, wherein the longitudinal profile of the force sensor is produced by spark erosion.

5. A method according to claim 4, for simultaneously manufacturing a row of force measuring cells, wherein the longitudinal profile of the force sensors is produced with wire electrodes on the transverse profile of an elongated plate, using a spark erosion technique through the entire length of the plate; and on at least one surface of the plate a plurality of identical masks for stagewise application of thin-layer sensors is produced by means of a multicopy technique; and further, after the application of the thin-layer sensors and the production of the longitudinal profile, the plate is divided into the individual force measuring cells by means of separating cuts which are made transversely to the longitudinal direction of the plate.

6. A force measuring cell as claimed in claim 1, wherein said bendable segments bound upper and lower sides of an opening forming a pair of centrally disposed opposed teeth projecting into said opening; an upper one of said link members being in a shape which is a substantially mirror image of a lower one of said link members; said upper one of said link members having a first portion adjacent its respective said tooth and second portion adjacent on opposite side of its respective said tooth; said first and second portions being ones of said bendable link members; said first portion having a smoothly varying cross section which is sufficiently greater than a correspondingly smoothly varying cross section of said second portion such that stresses of equal magnitude arise in said bendable segments when said load is applied.

* * * * *